(12) United States Patent
Rosocha

(10) Patent No.: US 8,919,029 B1
(45) Date of Patent: Dec. 30, 2014

(54) FISHING APPARATUS

(76) Inventor: Chester Theodore Rosocha, Pittstown, NJ (US)

(*) Notice: Subject to any disclaimer, the term of this patent is extended or adjusted under 35 U.S.C. 154(b) by 108 days.

(21) Appl. No.: 13/507,933

(22) Filed: Aug. 8, 2012

(51) Int. Cl.
*A01K 97/10* (2006.01)
*A01K 91/06* (2006.01)

(52) U.S. Cl.
CPC .................................. *A01K 91/065* (2013.01)
USPC ............................................................. 43/19.2

(58) Field of Classification Search
CPC ..... A01K 91/065; A01K 91/06; A01K 97/10; A01K 97/12
USPC .................................................. 43/19.2, 21.2
See application file for complete search history.

(56) References Cited

U.S. PATENT DOCUMENTS

| | | | | |
|---|---|---|---|---|
| 2,758,407 A * | 8/1956 | Speidell | ........................... | 43/19.2 |
| 3,691,668 A * | 9/1972 | Strebig | ........................... | 43/19.2 |
| 3,839,810 A * | 10/1974 | Lagasse | ........................... | 43/19.2 |
| 4,597,215 A * | 7/1986 | Otremba | ........................... | 43/19.2 |
| 4,916,847 A * | 4/1990 | Rusgo | ............................ | 43/19.2 |
| 4,932,151 A * | 6/1990 | Cicha | ............................. | 43/19.2 |
| 5,056,255 A * | 10/1991 | Campbell | ....................... | 43/19.2 |
| 5,540,010 A * | 7/1996 | Aragona | ......................... | 43/19.2 |
| 5,570,534 A * | 11/1996 | Ford | .............................. | 43/19.2 |
| 6,009,656 A * | 1/2000 | Knepp | ........................... | 43/26.1 |
| 6,401,380 B1 * | 6/2002 | McGonigal, Jr. | .............. | 43/19.2 |
| 6,415,543 B2 * | 7/2002 | Keller | ............................. | 43/19.2 |
| 6,634,134 B1 * | 10/2003 | Nyquist | ......................... | 43/19.2 |
| 7,845,106 B2 * | 12/2010 | Norman | ......................... | 43/21.2 |
| 8,136,289 B2 * | 3/2012 | Modglin | ........................ | 43/19.2 |
| 8,453,371 B1 * | 6/2013 | Sullivan | ......................... | 43/19.2 |
| 2006/0248778 A1 * | 11/2006 | Ward et al. | ..................... | 43/19.2 |
| 2007/0011937 A1 * | 1/2007 | Roh et al. | ....................... | 43/19.2 |

* cited by examiner

*Primary Examiner* — David Parsley
*Assistant Examiner* — Danielle Clerkley

(57) ABSTRACT

A fishing apparatus for implementing a substantially hands-free form of angling, includes a movable arm assembly securable to a fixed point, where the movable arm assembly is operatively engaged to a fishing rod having a distal end through which a fishing line extends, and is adapted for imparting a reciprocating motion to the distal end of the fishing rod relative to the fixed point.

1 Claim, 2 Drawing Sheets

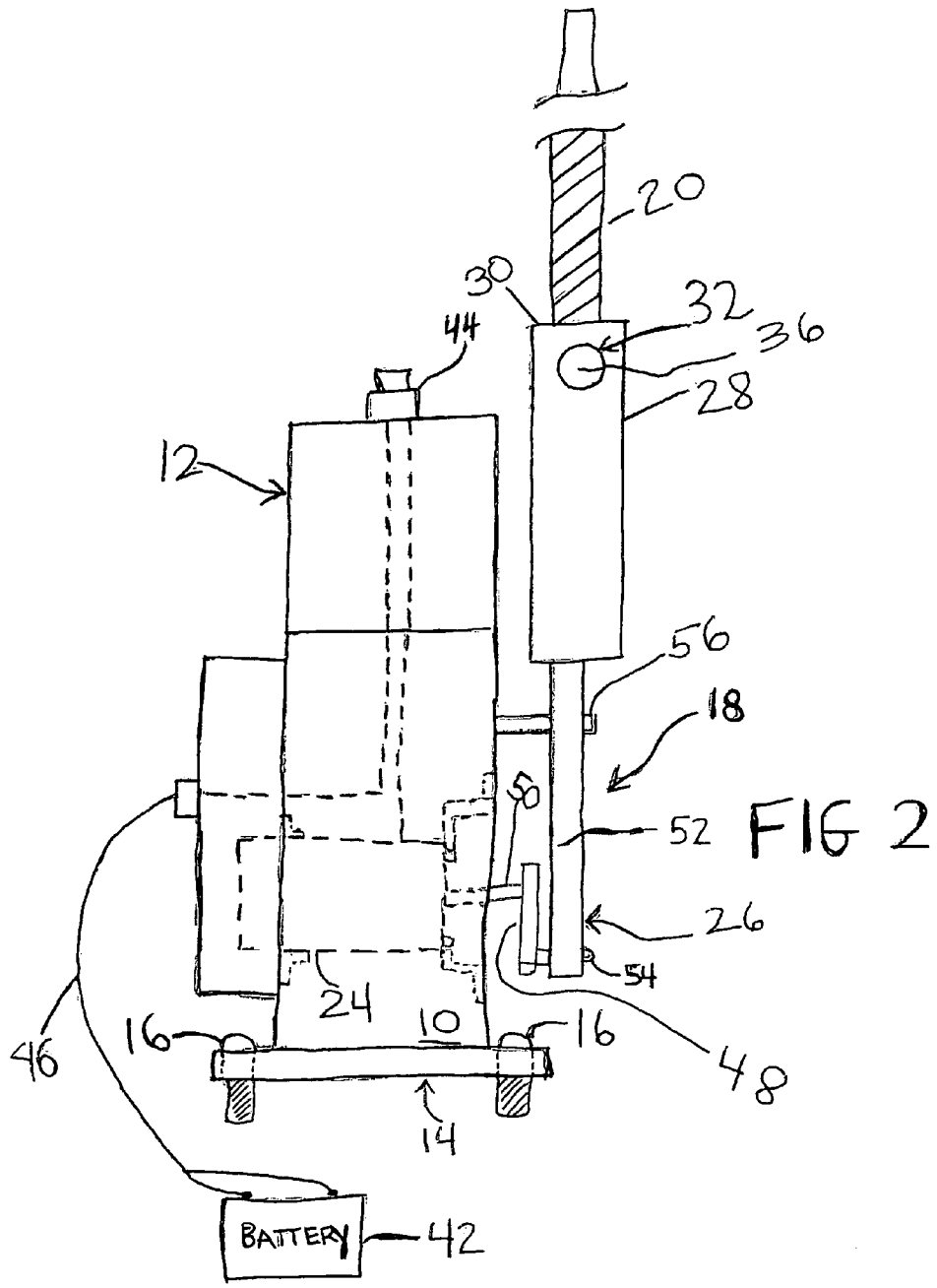

FISHING APPARATUS

FIELD OF THE INVENTION

The present invention relates to fishing apparatuses, and more particularly a fishing apparatus useful for implementing angling in a substantially hands-free manner.

BACKGROUND OF THE INVENTION

Fishing is an ancient practice of catching fish that dates back to, at least, around the Paleolithic period. Fishing techniques include hand gathering, netting, spearing, trapping and angling. The term fishing may be applied to catching other aquatic animals such as mollusks, cephalopods, crustaceans, and echinoderms. In addition to providing food and/or income, fishing also provides a recreational outlet for pleasure or sport where fish are caught and then released back into the wild.

One popular form of fishing is angling where a hook is used to catch fish. The hook is usually attached to a fishing line and the line is attached to a fishing rod. Such fishing rods are typically fitted with line guides and a fishing reel for storing, retrieving and playing out the fishing line. The fishing rod can be composed of fiberglass, carbon fiber, or graphite. The hook can be dressed with a lure or bait to attract the fish.

To initiate angling, the fishing line is cast out with the lure or bait over the water using the flexible fishing rod. The usual technique is for the angler to quickly flick the rod from behind toward the water. The line is then retrieved through the reel to draw the lure or bait through the water to entice the fish to strike. Through the rod and reel, the angler can move the lure or bait through the water in a manner that attracts the attention of the fish.

Frequently, anglers may use more than one fishing rod and line to maximize the opportunity for a catch. For example, trolling involves towing two or more fishing lines each dressed with a lure or bait through the water. This may be accomplished by mounting the fishing lines on a slow moving vessel. As mentioned, it is often desirable to add motion to the lure or bait such as by sweeping or jigging the fishing rod in a back and forth manner and confer the appearance and/or behavior of a dying, injured or fast moving prey that is particularly enticing to fish. However, this task would be difficult for an angler handling multiple fishing lines and/or rods.

Accordingly, there is a need for a fishing apparatus designed to assist angling in a substantially hands-free manner.

SUMMARY OF THE INVENTION

The present invention relates generally to a fishing apparatus for implementing angling in a substantially hands-free manner.

In one aspect of the present invention, there is provided a fishing apparatus for implementing angling in a substantially hands-free manner, which comprises a movable arm assembly securable to a fixed point, said movable arm assembly being operatively engaged to a fishing line, and adapted for imparting a reciprocating motion to the fishing line relative to the fixed point.

In another aspect of the present invention, there is provided a fishing apparatus for implementing angling in a substantially hands-free manner, which comprises a movable arm assembly securable to a fixed point, said movable arm assembly being operatively engaged to a fishing rod having a distal end through which a fishing line extends, and adapted for imparting a reciprocating motion to the distal end of the fishing rod relative to the fixed point.

BRIEF DESCRIPTION OF THE DRAWINGS

The following drawings are illustrative of embodiments of the present invention and are not intended to limit the invention as encompassed by the claims forming part of the application.

FIG. 2 is a side elevational view of the fishing apparatus in accordance with the present invention.

DETAILED DESCRIPTION OF THE INVENTION

Figure 1:
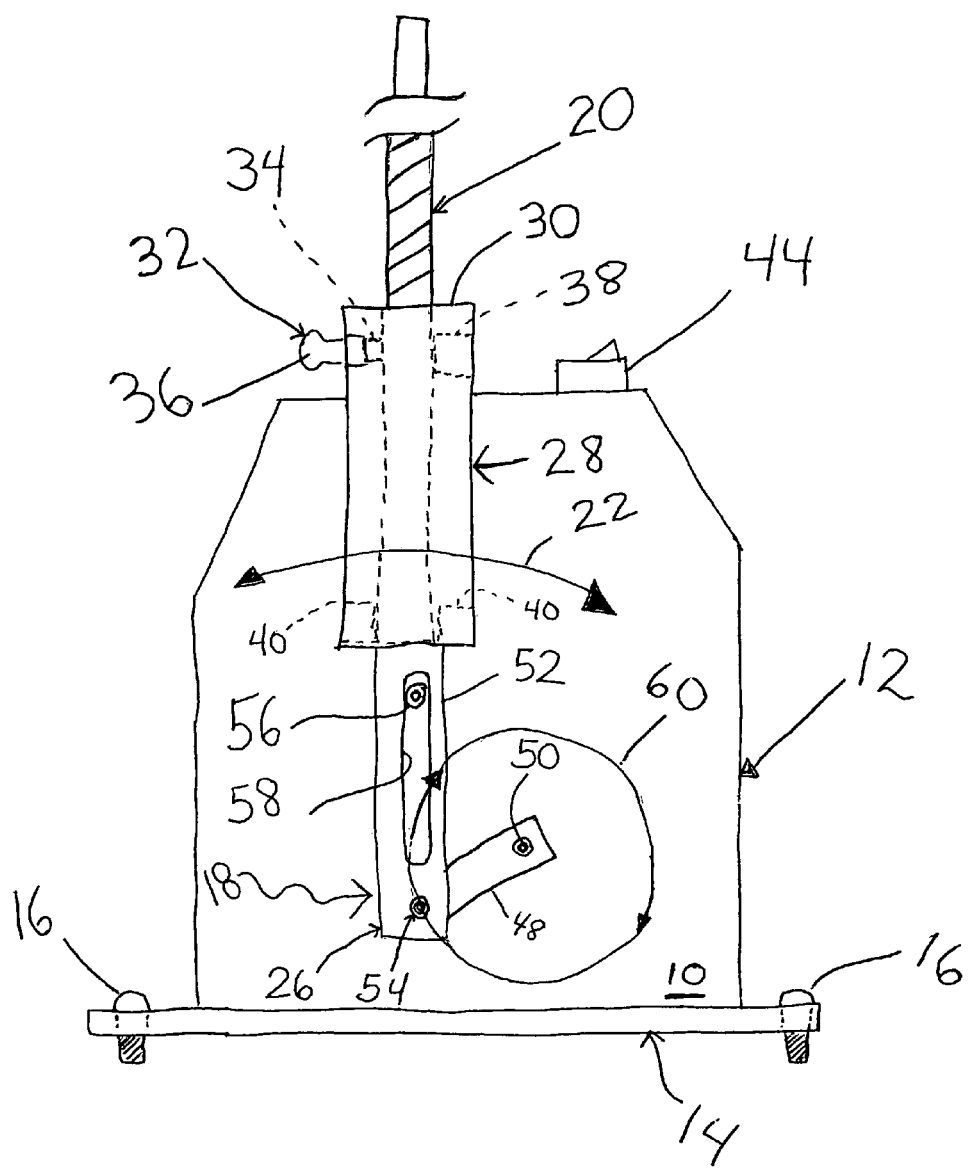
FIG. 1 is an elevational view of a fishing apparatus for one embodiment of the present invention.

The present invention is generally directed to a fishing apparatus for implementing angling in a substantially hands-free manner.

In one embodiment of the present invention, there is provided a fishing apparatus for implementing angling in a substantially hands-free manner, which comprises a movable arm assembly securable to a fixed point, wherein the movable arm assembly is operatively engaged to a fishing line, and adapted for imparting a reciprocating motion to the fishing line relative to the fixed point.

In another embodiment of the present invention, there is provided a fishing apparatus for implementing angling in a substantially hands-free manner, which comprises a movable arm assembly securable to a fixed point, where the movable arm assembly is operatively engaged to a fishing rod having a distal end through which a fishing line extends, and adapted for imparting a reciprocating motion to the distal end of the fishing rod relative to the fixed point.

Referring to FIGS. 1 and 2, there is a fishing apparatus identified generally by reference numeral 10 is shown for one embodiment of the present invention. The fishing apparatus 10 can be mounted to any size or type of vessel or boat. The fishing apparatus 10 includes a housing 12, and a base plate 14 with fasteners 16 for securing to a fixed point such as, for example, a seat, deck, floor or gunwale of a vessel or boat. The housing 12 and base plate 14 may be constructed through welding from a metal material such as, for example, stainless steel. The base plate 14 may include a swivel mechanism operatively engaged to the housing 12 for permitting rotation of the housing 12 about a vertical axis. Alternatively, the base plate 14 may be configured into a cylindrical shape for insertion into a tubular holder (e.g., cup holder, fishing rod holder) attached to a seat or other structure of the boat or vessel.

The fishing apparatus 10 further includes a movable arm assembly 18 adapted for operative engagement with a fishing rod 20 to impart a reciprocating motion 22 (e.g., jigging motion or sweeping motion) to the fishing rod 20 (as shown best in FIG. 1). The movable arm assembly 18 includes a motor assembly 24 (see FIG. 2) disposed within the housing 12, a linkage component 26 operatively engaged with the motor assembly 24, and a fishing rod holder 28 attached to the mechanical linkage 26 and adapted for receiving and securely retaining the fishing rod 20 thereon. Optionally, the fishing apparatus 10 includes a cover (not shown) enclosing the linkage component 26 to protect against contact with moving parts.

The fishing rod holder 28 includes an open end 30 for receiving the proximal end (i.e., handle) of the fishing rod 20. The fishing rod 20 is retained in place by a pull pin mechanism 32. The pull pin mechanism 32 includes a pin 34 extending into the holder 28 and a knob 36 located exterior to the holder 28. The pin 34 is normally spring-biased toward the inner position in abutment against the fishing rod 20 and spacer 36. In this manner, the fishing rod 20 is securely retained within the holder 28. Spacers 40 located at the lower end of the holder 28 further confines the fishing rod 20 in place. To release the fishing rod 20, the angler retracts the pin 34 of the pull pin mechanism 32 through the knob 36 from the fishing rod 20 and withdraws the fishing rod 20 from the holder 28.

The motor assembly 24 is powered by a battery source 42 (e.g., 12-volt battery) via a power cord 46 and a switch mechanism 44 (as shown best in FIG. 2). The motor assembly 24 may be constructed, for example, using a combination of an electric motor and a worm gear reduction mechanism (not shown) to provide power to the reciprocating motion of the fishing rod 20. The worm gear reduction mechanism (not shown) is used to generate the amount of force needed from the output of the electric motor. This is accomplished by enhancing the torque of the motor assembly 24, while moderating the output speed. The linkage component 26 converts the rotational output of the motor assembly 24 into the reciprocating back-and-forth motion of the fishing rod 20.

The linkage component 26 includes a crank or cam 48 having one end operatively engaged to the motor assembly 24 via driveshaft 50, and a connecting rod 52 operatively engaged to the opposite end of the crank 48 via connecting pin 54. The connecting rod 52 is rigidly attached at the opposite end to the base of the fishing rod holder 28. A static stud 56 affixed to the housing 12 is slidably disposed within a slotted channel 58 of the connecting rod 52. The crank 48 rotates around along the path of travel 60 (see FIG. 1) as the motor assembly 24 turns. The rotation of the crank 48 urges the connecting rod 52 to articulate back and forth as the static stud 56 slides within the slotted channel 58 of the connecting rod 52. This mechanical action causes the fishing rod holder 28 and the fishing rod 20 to move in a reciprocating motion 22 (e.g., jigging motion or sweeping motion).

In reference to FIGS. 1 and 2, the operation of the fishing apparatus 10 for one embodiment of the present invention will be described herein. The angler lets out the fishing line with a hook optionally dressed with a lure or bait from a fishing rod 20 into the water. The fishing reel (not shown) of the fishing rod 20 is set to a drag setting which allows the rod 20 to release additional fishing line in the event a fish strikes the hook and avoid breakage of the fishing line. With the knob 36 of the pull pin mechanism 32 moved to the outer position, the handle portion or proximal end of the fishing rod 20 (i.e., end opposite from the end where the fishing line extends) is inserted into the fishing rod holder 28 of the fishing apparatus 10. The knob 36 is released to securely retain the inserted portion of the fishing rod 20 within the holder 28.

The fishing apparatus 10 is activated via the switch 44. This initiates the sweeping or jigging motion of the fishing rod 20 in back and forth manner. The resulting motion causes the lure or bait to move through the water to attract the fish, as the vessel or boat trolls in the water. When a fish strikes the hook, the fishing apparatus 10 is shut off via the switch 44 and release the fishing rod 20 via the pull pin mechanism 32. The angler retrieves the fishing rod 20 to complete the catch of the fish hooked to the fishing line.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed:

1. A fishing apparatus for implementing angling in a substantially hands free manner comprising:
A) a housing;
B) a base, the base comprises a lower horizontal part of the housing;
C) a plurality of fasteners for securing the base to a boat;
D) a movable arm assembly configured to hold a fishing rod, wherein the movable arm assembly includes a linkage component and a fishing rod holder; wherein the linkage component comprises a slotted channel configured to rotate and urge the movable arm assembly to articulate;
E) a motor assembly secured on the inside of the housing;
F) a push pull pin releasably holds the fishing rod secure inside the fishing rod holder, to release the fishing rod the push pull pin is pulled and the fishing rod is withdrawn;
G) a 12 volt battery, wherein the motor assembly is connected to and powered by the 12 volt battery;
H) a power cord connects the battery to the motor assembly;
I) a switch mechanism configured to start and stop the motor assembly;
J) the linkage component and a crank connect the motor assembly to the fishing rod holder;
K) at least one connecting pin rigidly attaches the movable arm assembly to the crank;
L) a static stud having a first end directly secured to the housing and a second end slideably disposed within the slotted channel of the linkage component;
wherein the linkage component connects the fishing rod holder to the motor assembly;
wherein the fishing rod holder comprises an upper part of the moveable arm assembly;
wherein the motor assembly further comprises an electric motor and a worm gear reduction mechanism to provide power; wherein the motor assembly provides a reciprocating sweeping motion to the fishing rod;
wherein the worm gear mechanism generates an amount of force from the electric motor to provide torque to the moveable arm assembly;
wherein the fishing apparatus is activated by the switch mechanism to initiate the reciprocating sweeping motion which causes a lure or bait to move through the water to attract fish while a boat or a vessel trolls in water.

* * * * *